(12) United States Patent
Engelmann (10) Patent No.: US 10,526,755 B2
(45) Date of Patent: Jan. 7, 2020

(54) TRUCK POSITION CONTROL SYSTEM FOR MILLING OPERATIONS

(71) Applicant: Catepillar Paving Products Inc., Brooklyn Park, MN (US)

(72) Inventor: Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/735,253

(22) PCT Filed: Nov. 4, 2016

(86) PCT No.: PCT/US2016/060563
§ 371 (c)(1),
(2) Date: Dec. 11, 2017

(87) PCT Pub. No.: WO2017/079581
PCT Pub. Date: May 11, 2017

(65) Prior Publication Data
US 2018/0298569 A1    Oct. 18, 2018

Related U.S. Application Data

(63) Continuation of application No. 14/933,534, filed on Nov. 5, 2015, now abandoned.

(51) Int. Cl.
*E01C 23/088* (2006.01)
*E02F 9/26* (2006.01)
(Continued)

(52) U.S. Cl.
CPC .............. *E01C 23/088* (2013.01); *B60R 1/00* (2013.01); *B65G 67/22* (2013.01); *E01C 23/127* (2013.01);
(Continued)

(58) Field of Classification Search
CPC .. E01C 23/088; E01C 23/127; E01C 2301/00; B60R 1/00; B60R 2300/50;
(Continued)

(56) References Cited

U.S. PATENT DOCUMENTS 4,193,636 A    3/1980 Jakob
5,546,093 A    8/1996 Gudat et al.
(Continued)

FOREIGN PATENT DOCUMENTS

WO    WO 2008/042244 A2    4/2008

OTHER PUBLICATIONS

International Search Report dated Feb. 28, 2017, in corresponding International Application No. PCT/US2016/060563 (3 pages).

*Primary Examiner* — Marthe Y Marc-Coleman
(74) *Attorney, Agent, or Firm* — Finnegan, Henderson, Farabow, Garrett & Dunner, LLP (57) ABSTRACT

A control system (40) is disclosed for a mobile machine (10) configured to transfer material into a receptacle (18). The control system may include a first sensor (44) configured to generate a first signal indicative of one of a speed of the mobile machine and a distance between the mobile machine and the receptacle, a display system (56) having at least one display device (58) configured to show information relating to one or more of the mobile machine and the receptacle to an operator of the receptacle, and a controller electronically connected to the first sensor and the display system. The controller may be configured to determine a relative speed of the receptacle with respect to the mobile machine based at least in part on the first signal and generate on the at least one display device a first visual indicator (68) indicative of the relative speed of the receptacle with respect to the mobile machine.

20 Claims, 6 Drawing Sheets (51) Int. Cl.
*E02F 9/20* (2006.01)
*B60R 1/00* (2006.01)
*E01C 23/12* (2006.01)
*B65G 67/22* (2006.01)

(52) U.S. Cl.
CPC ............ *E02F 9/2054* (2013.01); *E02F 9/265* (2013.01); *B60R 2300/50* (2013.01); *E01C 2301/00* (2013.01)

(58) Field of Classification Search
CPC ........ B65G 67/22; E02F 9/2054; E02F 9/261; E02F 9/265
USPC .......................................................... 701/50
See application file for complete search history.

(56) References Cited

U.S. PATENT DOCUMENTS

| | | | |
|---|---|---|---|
| 8,606,454 | B2 | 12/2013 | Wang et al. |
| 8,626,406 | B2 | 1/2014 | Scleicher et al. |
| 9,481,964 | B1 | 11/2016 | Marsolek |
| 2008/0258535 | A1* | 10/2008 | Berning ............. B62D 33/0636 299/39.4 |
| 2009/0142133 | A1 | 6/2009 | Glee et al. |
| 2011/0061762 | A1* | 3/2011 | Madsen ................ A01D 43/087 141/1 |
| 2011/0123268 | A1* | 5/2011 | Berning ................ E01C 23/088 404/90 |
| 2011/0153117 | A1 | 6/2011 | Koch et al. |
| 2011/0307149 | A1* | 12/2011 | Pighi .................... A01D 41/127 701/50 |
| 2013/0045067 | A1 | 2/2013 | Pickett et al. |
| 2013/0076101 | A1 | 3/2013 | Simon |
| 2013/0080000 | A1 | 3/2013 | Von der Lippe et al. |
| 2013/0189032 | A1 | 7/2013 | Bellerose et al. |
| 2014/0054949 | A1 | 2/2014 | Berning et al. |
| 2014/0205400 | A1* | 7/2014 | von Schonebeck .. E01C 23/088 414/345 |
| 2014/0333118 | A1 | 11/2014 | Abresch et al. |
| 2015/0139729 | A1 | 5/2015 | Graham et al. |
| 2015/0167261 | A1 | 6/2015 | Berning et al. |
| 2015/0353291 | A1 | 12/2015 | Teichrob et al. |
| 2016/0052731 | A1* | 2/2016 | Berning ............... B65G 41/002 299/1.9 |
| 2016/0137242 | A1 | 5/2016 | Dahm et al. |
| 2016/0298306 | A1 | 10/2016 | de Kontz et al. |

* cited by examiner

TRUCK POSITION CONTROL SYSTEM FOR MILLING OPERATIONS

TECHNICAL FIELD

The present disclosure relates generally to a control system and, more particularly, to a truck position control system for milling operations.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

To remove a layer of asphalt from the roadway, the cold planer travels forward at a generally constant speed while the milling drum is in a lowered position and rotating. As the cold planer travels forward, the haul truck must also travel forward in order to continually receive the broken up material ejected from the conveyor of the cold planer. To avoid situations where material spillage can occur, such as when the haul truck is too far from or too close to the cold planer, operators have implemented signaling techniques that allow cold planer operators to communicate to haul truck operators when to speed up or slow down during a milling operation. Known signaling techniques typically require the cold planer operator to continually monitor the distance between the cold planer and the haul truck and manually send positioning signals to the haul truck operator, such as with the blast of a horn. However, these techniques can distract the cold planer operator from other important aspects of operating the cold planer and involve the operator's subjective interpretation of proper distancing between the cold planer and haul truck. Further, the manual signals can be difficult for truck operators to interpret at times, resulting in miscalculated control and material spillage.

One attempt to provide automated position signaling to a haul truck during a milling operation is disclosed in U.S. Patent Application Publication No. 2013/0076101 A1 of Simon that published on Mar. 28, 2013 ("the '101 publication"). In particular, the '101 publication discloses a system for automatically determining a distance between a milling machine and haul truck and simultaneously triggering control commands to the operator of the haul truck. The system includes a milling machine equipped with an ultrasonic sensor attached to the front of the milling machine for determining the distance between the milling machine and a haul truck. A controller connected to the sensor determines when the haul truck reaches a minimum or maximum allowable distance from the milling machine and generates "forward" and "stop" signals to command the haul truck operator to move forward or stop moving when the minimum or maximum distance is reached, respectively. This stop-and-go process continues until the haul truck is filled.

While the system of the '101 publication may allow for automated command signal generation to the haul truck operator, it may not be optimum. In particular, the "forward" and "stop" commands generated by the system of the '101 publication may cause the haul truck operator to react too quickly, too slowly, or in a jerky manner to the command signals. Further, the system of the '101 publication may deprive cold planer and haul truck operators of the ability to control material distribution within the haul truck and may limit them to the use of stop-and-go filling techniques.

The truck position control system of the present disclosure solves one or more of the problems set forth above and/or other problems in the art.

SUMMARY

In one aspect, the present disclosure is related to a control system for a mobile machine configured to transfer material into a receptacle. The control system may include a first sensor configured to generate a first signal indicative of one of a speed of the mobile machine and a distance between the mobile machine and the receptacle, a display system having at least one display device configured to show information relating to one or more of the mobile machine and the receptacle to an operator of the receptacle, and a controller electronically connected to the first sensor and the display system. The controller may be configured to determine a relative speed of the receptacle with respect to the mobile machine based at least in part on the first signal and generate on the at least one display device a first visual indicator indicative of the relative speed of the receptacle with respect to the mobile machine.

In another aspect, the present disclosure relates to a method. The method may include transferring material from a mobile machine into a receptacle, receiving a first signal indicative of one of a speed of the mobile machine and a distance between the mobile machine and the receptacle, determining a relative speed of the receptacle with respect to the mobile machine based at least on part on the first signal, and displaying on at least one display device a first visual indicator indicative of the relative speed of the receptacle with respect to the mobile machine.

In yet another aspect, the present disclosure relates to a mobile machine configured to transfer material into a receptacle. The mobile machined may include a cutting system, a conveyor assembly configured to transfer material into the receptacle, and a control system associated with the mobile machine. The control system may include a first sensor configured to generate a first signal indicative of one of a speed of the mobile machine and a distance between the mobile machine and the receptacle. The control system may further include a display system having at least one display device configured to show information relating to one or more of the mobile machine and the receptacle to an operator of the receptacle and a controller electronically connected to the first sensor and the display system. The controller may be configured to determine a relative speed of the receptacle with respect to the mobile machine based at least in part on the first signal and generate on the at least one display device a first visual indicator indicative of one or more of a degree to which the receptacle is traveling faster than the mobile machine, a degree to which the receptacle is travelling slower than the mobile machine, or when the relative speed of the receptacle with respect to the mobile machine is within a threshold range.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
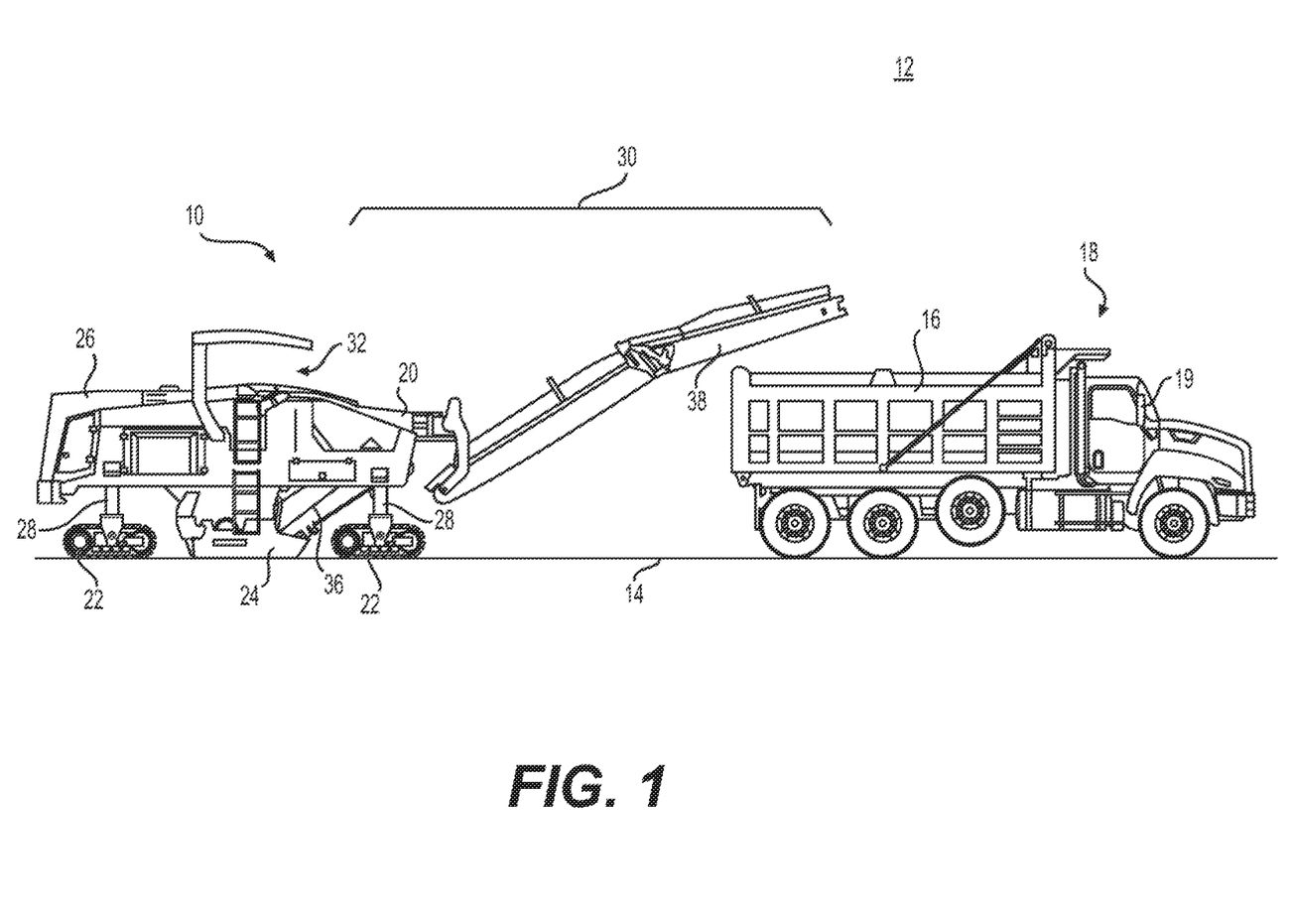
FIG. 1 is a side view illustration of an exemplary disclosed cold planer and haul truck.

FIG. 1 shows a cold planer 10 employed at a worksite 12, such as, for example, a roadway milling operation. As part of the milling operation, cold planer 10 may mill a surface 14 of the roadway and transfer milled material into a bed 16 of a haul truck 18. Haul truck 18 may be controlled by an operator from within an operator station of haul truck 18. The haul truck operator may use mirrors 19 attached to haul truck 18 and one or more control devices (e.g., a throttle control, a braking control, a steering device, etc.) within the operator station to cause haul truck 18 to travel in front of or alongside cold planer 10 to receive milled material as cold planer 10 traverses surface 14. When full, haul truck 18 may depart from cold planer 10 to deliver the milled material to a storage site, processing plant, or other facility, and a second transport vehicle may approach cold planer 10 to replace haul truck 18 so the milling operation can continue.

Cold planer 10 may have a frame 20 supported by one or more traction devices 22, a drum housing 24 that contains a milling drum having a plurality of cutting tools for breaking up surface 14, and an engine 26 mounted to frame 20 and configured to drive traction devices 22, the milling drum within drum housing 24, and/or other components. Traction devices 22 may include either wheels or tracks connected to actuators 28 that are adapted to controllably raise and lower frame 20 relative to a ground surface. It should be noted that, in the disclosed embodiment, raising and lowering of frame 20 may also function to vary a milling depth of the milling drum into surface 14. In some embodiments, the same or different actuators 28 may also be used to steer cold planer 10 and or to adjust a travel speed of traction devices 22 (e.g., to speed up or brake traction devices 22), if desired. A conveyor assembly 30 may be pivotally connected at a leading end to frame 20 and configured to transport material away from drum housing 24 and into a receptacle, such as haul truck 18. Other cold planer configurations (e.g., rear-loading) and/or types of receptacles may be used, if desired.

Frame 20 may also support an operator station 32. Operator station 32 may house any number of interface devices 34 (shown only in FIG. 3) used to control cold planer 10. Interface devices 34 may include, among other things, one or more displays, warning devices, and an input devices (e.g., buttons, levers, dials, switches, knobs, keyboards, touch screen devices, pedals steering wheels, etc.). In some embodiments, operator station 32 may be offboard cold planer 10. For example, operator station 32 may embody a remote control, such as a handheld controller, that an operator may use to control cold planer 10 from anywhere on worksite 12. Operator station 32 may alternatively embody a software program and user interface for a computer, and may include a combination of hardware and software. In other embodiments, cold planer 10 may be autonomous and may not include operator station 32.

Conveyor assembly 30 may include a first conveyor 36 adjacent drum housing 24 that is configured to transfer milled material to a second conveyor 38. Conveyor 38 may be pivotally attached to frame 20 so that the height at which milled material leaves conveyor 38 can be adjusted. That is, a pivotal orientation of conveyor 38 in the vertical direction may be adjusted to raise and lower conveyor 38. Conveyor 38 may also be pivotally attached to frame 20 so that the lateral location at which milled material leaves conveyor 38 may be adjusted. That is, a pivotal orientation of conveyor 38 in the horizontal direction may be adjusted to move conveyor 38 from side to side.

Figure 2:
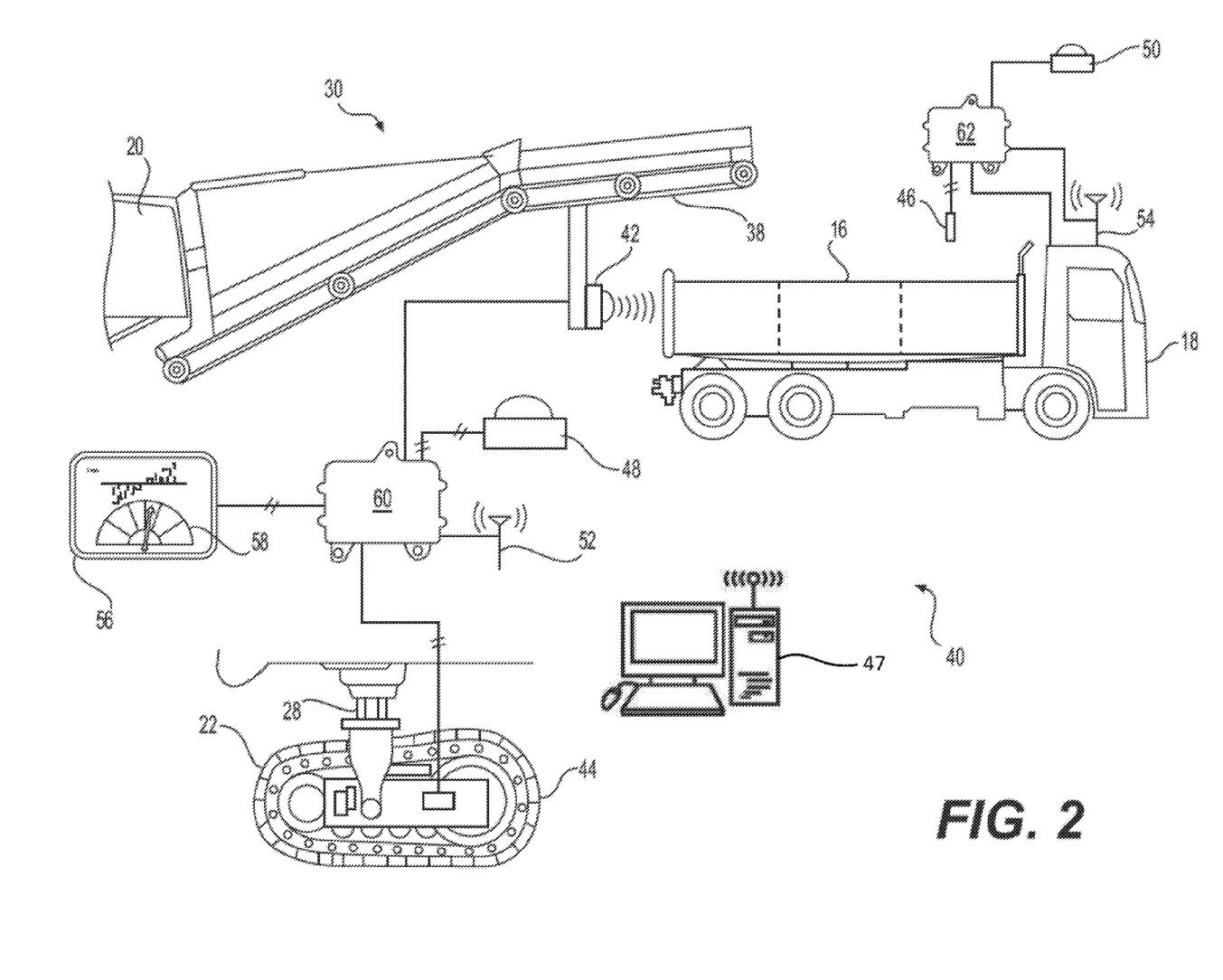
FIG. 2 is a diagrammatic illustration of an exemplary disclosed truck position control system that may be used with the cold planer of FIG. 1.

As illustrated in FIG. 2, a truck position control system 40 ("control system") may be associated with cold planer 10 and include elements that cooperate to monitor and analyze aspects of transferring material into haul truck 18 and facilitate communication between cold planer 10 and haul truck 18. For example, elements of control system 40 may cooperate to determine one or more of a distance D between cold planer 10 and haul truck 18, a speed $V_{CP}$ of cold planer 10, a speed $V_{HT}$ of haul truck 18, and a relative speed $V_{REL}$ of haul truck 18 with respect to cold planer 10. Elements of control system 40 may include a position sensor 42 connected to cold planer 10, one or more speed sensors 44, 46, an off-board computer 47, one or more locating devices 48, 50, one or more communication devices 52, 54, a display system 56 having one or more display devices 58, and one or more controllers 60, 62 in electronic communication with one or more of the other components. Information based on and/or including D, $V_{CP}$, $V_{HT}$, and $V_{REL}$ may be shown to the operators of haul truck 18 and/or cold planer 10 via display system 56 and used to control the position of haul truck 18 with respect to cold planer 10 during milling processes.

Position sensor 42 may be a device configured to generate a signal indicative of a distance between itself and another object by physically sensing the location of the other object. For example, position sensor 42 may be an optical sensor, an ultrasonic sensor, a laser sensor, or another type of sensor that is configured to generate a signal indicative of a distance between another object and itself. Position sensor 42 may be connected to a component of cold planer 10 (e.g., conveyor 38) and configured to determine a distance between cold planer 10 and another object, such as haul truck 18. Position sensor 42 may be mounted to conveyor 38 or at another component of cold planer 10 where it is able to detect objects in front of and/or to the side of cold planer 10. The signal generated by position sensor 42 may be sent to controller 60 for further processing.

In some embodiments, position sensor 42 may be located on cold planer 10 at a known distance from a reference point cold planer 10 (e.g., an end of conveyor 38) such that the signal generated by position sensor 42 can be used to determine a distance between the reference point of cold planer 10 and other objects, such as haul truck 18 and/or its various features. For example, position sensor 42 may be located a known offset distance from the end of conveyor 38 so that the signal generated by position sensor 42 can be used by controller 60 in conjunction with the known offset distance to determine a distance between the end of conveyor 38 and, for example, the back of haul truck 18. In some embodiments, position sensor 42 may be configured to identify or allow for the identification of profiles, edges, and/or other features of haul truck 18 and generate a signal indicative of a distance between those features and the reference point. For example, the signal generated by position sensor 42 may be indicative of the distance between the end of conveyor 38 and one or more of the lateral sides of haul truck 18 (e.g., left, right, front, back, etc.), which may be utilized ensure proper loading of haul truck 18 and to prevent spillage of milled material.

The signal generated by position sensor 42 may be utilized to generate a quantitative and/or qualitative representation of the distance between components of cold planer 10 (e.g., the end of conveyor 38) and haul truck 18. For example, the signal generated by position sensor 42 may be utilized to determine an actual distance between conveyor 38 and haul truck 18. The actual distance or the original signal may also or alternatively be utilized to generate audible and/or visible indicia of distance, such as by varying sounds (e.g., beeps, tones, etc.) and/or lights (e.g., flashes, bars, colors, etc.) or by creating graphical or other visual indicators configured to communicate speed and/or distance information. Such indicia may allow operators to manually maintain a desired distance between, for example, conveyor 38 and haul truck 18 during a milling operation to ensure that haul truck 18 is properly loaded with milled material. This information may also be used to prevent unintended spillage of milled material or contact between cold planer 10 and haul truck 18.

The signal generated by position sensor 42 may be combined with other information, such as a mass flow rate or other production rate metric of milled material and known dimensions of haul truck 18, to determine and/or monitor the distribution of material within bed 16 of haul truck 18. For example, in some embodiments, cold planer 10 may include a sensor or system configured to determine an amount of material that is being and/or has been transferred into bed 16 by conveyor 38. For example, such a sensor or system may include a radioactive detection system, a laser scanning system, an optical scanner, a camera, an ultrasonic sensor, a belt scale, a conveyor motor power sensory system, a material profile measurement system, and or combinations thereof configured to generate a signal indicative of amounts of material that are being or have been transferred into bed 16. This information may be used by controller 60 in conjunction with signals from position sensor 42 and/or other information over a period of time to determine the distribution of material within bed 16 of haul truck 18.

The signal generated by position sensor 42 may also or alternatively be combined with other information for characterizing how much time haul truck 18 spends at certain distances from cold planer 10. For example, when information indicative of how much material is being or has been transferred into haul truck 18 is not readily available, the distribution of material in bed 16 may be estimated or qualitatively understood by operators based on an understanding of how much time haul truck 18 spent at certain distances from cold planer 10 during a milling operation. The amount of time that haul truck spends at a certain distance from cold planer 10 may relate to or be indicative of how much material was transferred into a certain area of bed 16 that corresponds to the distance measured by position sensor 42 during that time.

Speed sensors 44, 46 may be associated with one or more of cold planer 10 and haul truck 18 and configured to determine the speed $V_{CP}$ of cold planer 10 and the speed $V_{HT}$ of haul truck 18, respectively. Speed sensor 44 may be associated with one or more traction devices 22 of cold planer 10 and configured to generate a signal indicative of $V_{CP}$. For example, speed sensor may be a magnetic pickup-type sensor in communication with a magnet embedded within a rotational component of traction device 22. Speed sensor 44 may alternatively be associated with a different component of cold planer 10 (e.g., a driveshaft, a transmission, flywheel, etc.), or embody a different type of sensor. In some embodiments, speed sensor 44 may be a GPS device, Doppler device, or other type of position detecting device that is configured to generate successive position signals that can be used to determine a change in the position of cold planer 10 with respect to time.

Speed sensor 46 may be associated haul truck 18 and configured to generate a signal indicative of $V_{HT}$. Speed sensor 46 may be associated with a component of haul truck 18, such as tractions devices (e.g., wheels, tracks, a transmission, etc.) whose behavior can be sensed and used to determine $V_{HT}$. For example, speed sensor 46 may be a magnetic pickup-type sensor in communication with a magnet embedded within a rotational component of haul truck 18. In some embodiments, speed sensor 46 may be a GPS device, Doppler device, or other type of position detecting device that is configured to generate successive position signals that can be used to determine a change in the position of haul truck 18 with respect to time.

Off-board computer 47 may be a component of a data collection and/or analysis network associated with one or more of cold planer 10 and haul truck 18. Off-board computer 47 may be configured to receive data generated by cold planer 10 and/or haul truck 18 via communication devices 52, 54. In some situations, off-board computer 47 may facilitate transferring data between cold planer 10 and haul truck 18. For example, off-board computer 47 maybe configured to receive, among other things, the signal from speed sensor 46 and transfer the same signal to controller 60 for further processing. In some situations, off-board computer 47 may receive the signal from speed sensor 46, process it, and transfer a different signal to controller 60 indicative of the speed $V_{HT}$ of haul truck 18. Off-board computer 47 may also be configured to receive, process, and/or transfer other or additional information associated with cold planer 10 and/or haul truck 18. In some embodiments, off-board computer 47 may be onboard cold planer 10 or the functions of off-board computer 47 may be performed by controller 60 or another onboard device.

Off-board computer 47 may embody a single microprocessor or multiple microprocessors that include a means for receiving, processing, and transferring data and other information generated by cold planer 10 and/or haul truck 18. For example, off-board computer 47 may include a memory, a secondary storage device, a clock, and a processor, such as a central processing unit or any other means for accomplishing a task consistent with the present disclosure. Numerous commercially available microprocessors can be configured to perform the functions of off-board computer 47. Various other known circuits may be associated with off-board computer 47, including signal-conditioning circuitry, communication circuitry, and other appropriate circuitry. Off-board computer 47 may be further communicatively coupled with an external computer system, as desired.

Locating devices 48, 50 may be associated with one or more of cold planer 10 and haul truck 18 and configured to generate a signal indicative of a geographical position of cold planer 10 or haul truck 18, respectively, relative to a local reference point, a coordinate system associated with a work area, a coordinate system associated with Earth, or any other type of 2-D or 3-D coordinate system. For example, locating devices 48, 50 may embody an electronic transponder configured to communicate with one or more satellites, or a local radio or laser transmitting system used to determine a relative geographical location of itself. Locating devices 48, 50 may receive and analyze high-frequency, low-power radio or laser signals from multiple locations to triangulate a relative 3-D geographical position. Signals generated by one or more of locating devices 48, 50 may be communicated to controller 60 for further processing.

Communication devices 52, 54 may include hardware and/or software that enables sending and receiving of data messages between controller 60 and controller 62 or between one or more of controllers 60, 62 and off-board entities. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication devices 52, 54 to exchange information between each other and/or other devices. For example, communication device 52 may be associated with cold planer 10 and configured to communicate with communication device 54 associated with haul truck 18. In this way, information contained within or collected by controller 62 may be communicated to controller 60 (and vice versa) via communication devices 52, 54.

Figure 3:
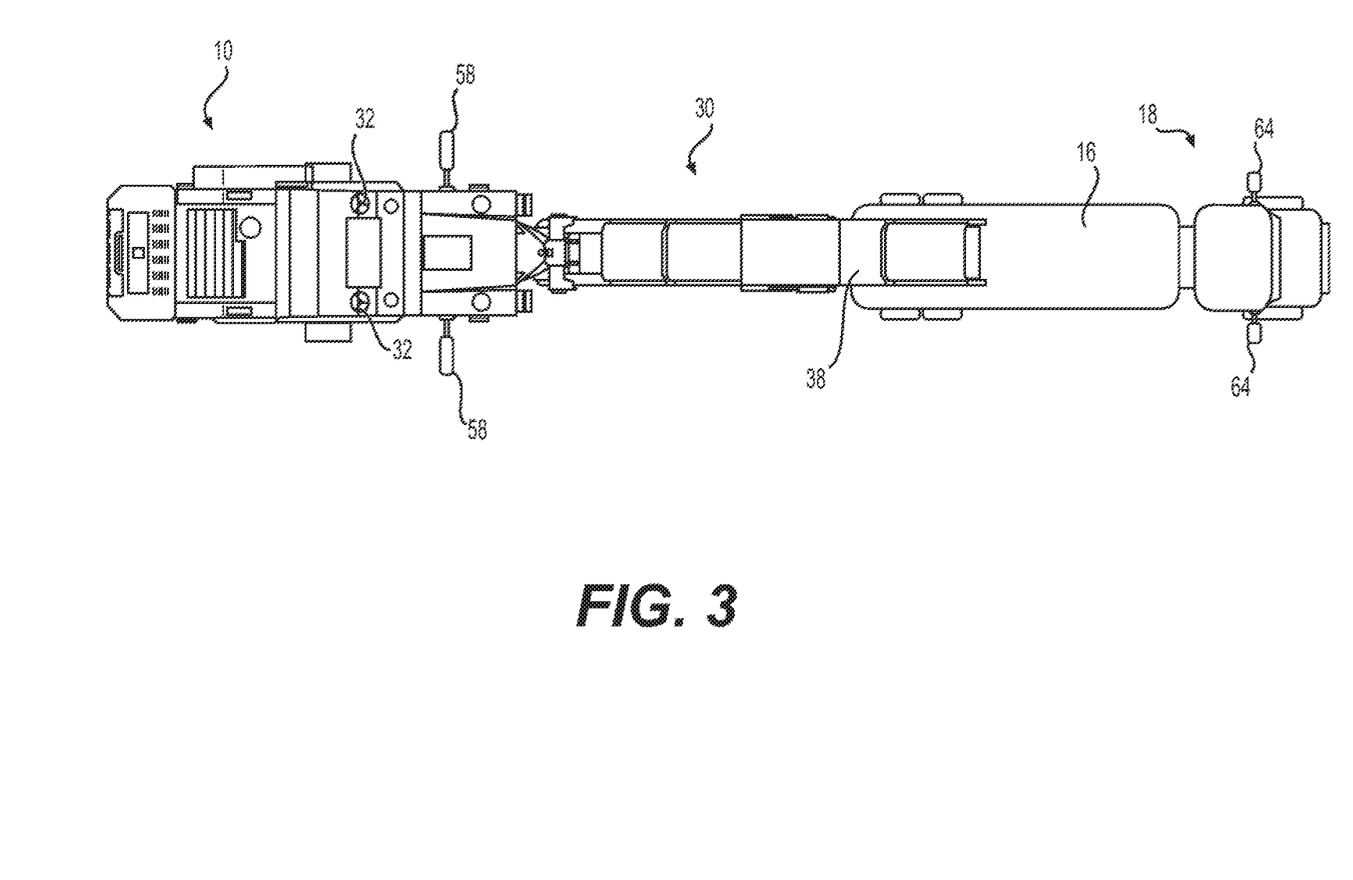
FIG. 3 is a top view illustration of the cold planer and haul truck of FIG. 1.

Display system 56 may include at least one display device 58 configured to show information relating to one or more of cold planer 10 and haul truck 18 to an operator of haul truck 18. When information sharing between cold planer 10 and haul truck 18 via communication devices 52, 54 is not available, display system 56 may include one or more display devices disposed on cold planer 10 such that each display device 58 can be visible to the operator of haul truck 18 while the operator is positioned for controlling haul truck 18. For example, as shown in FIG. 3, display devices 58 may be connected to exterior components of cold planer 10 that are visible from within haul truck 18. In the example of FIG. 3, display devices 58 may be configured to extend outwardly from first and second sides of cold planer 10 such that they can be seen by the operator of haul truck 18 via one or more mirrors 64 of haul truck 18. In this way, operators of haul trucks not equipped with communication device 54 may be allowed to receive and view information on display devices 58 through the familiar use of their mirrors while operating haul truck 18 at a desired distance from cold planer 10.

In the example of FIG. 3, display devices 58 are attached to frame 20 (referring to FIG. 1) or a body component of cold planer 10. It is understood, however, that display devices 58 may be attached to or integral with other components of cold planer 10. For example, display devices 58 may be configured to attach to mirrors of cold planer 10 that are used by operators of cold planer 10. That is, display devices 58 may be configured to attach to a rear side (from the point of view of an operator of cold planer 10) of a mirror assembly. Alternatively, display devices 58 may be integral with a mirror assembly such that one side contains a mirror visible to the operator of cold planer 10 and another side contains display device 58. When attached to or combined with a mirror assembly, the position of display device 58 may be adjustable to permit the mirror and display device to be independently positioned for optimal viewing by the operators of cold planer 10 and haul truck 18. In some embodiments, display devices 58 may be attached to multiple sides of cold planer 10 to allow operators of haul truck 18 to view information from either mirror as required for certain maneuvering or by preference. Other locations and configurations of display devices 58 on cold planer 10 may be used, as desired, to allow display device 58 to be seen by the operator of haul truck 18 (and/or the operator of cold planer 10) during operation.

Figure 4:
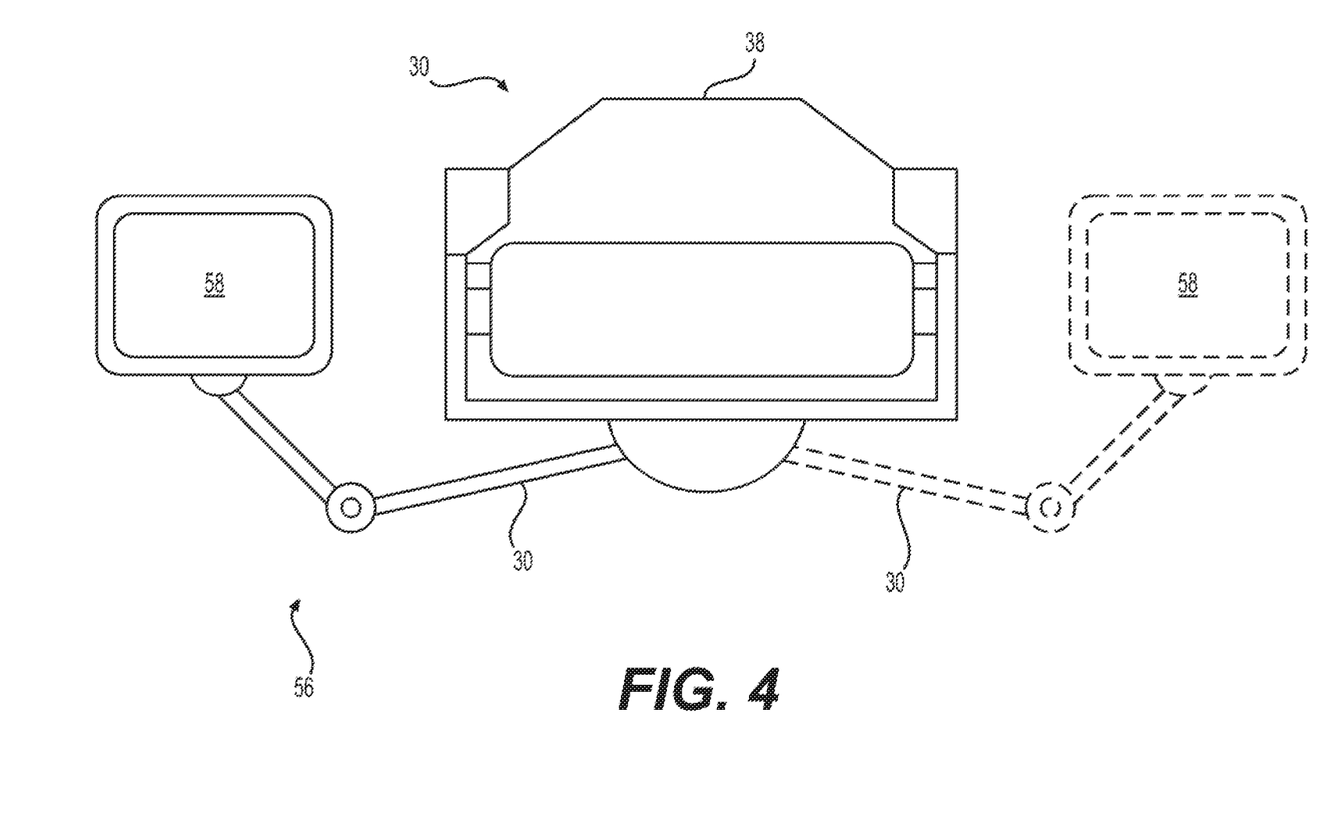
FIG. 4 is a front view illustration of an exemplary disclosed display system that may be used with the cold planer of FIG. 1.

In the example of FIG. 3, display devices 58 extend from opposite sides of cold planer 10. It is understood, however, that display devices may be attached to other components of cold planer 10 and that only one display device may be used, if desired. For example, as shown in FIG. 4, display device 58 may be attached to conveyor assembly 30 of cold planer 10. Because conveyor assembly is generally central to cold planer 10, display system 56 may include mounting components 66 configured suspend display device outwardly from conveyor assembly 30 so it may be visible to the operator of haul truck 18. Mounting components 66 may be adjustable to allow display device 58 to be tilted (e.g., forward, backward, side-to-side, etc.), rotated (e.g., on a vertical axis, on a horizontal axis, etc.), and/or raised and lowered, as desired. Mounting components 66 may be articulated or otherwise adjustable (e.g., by hinges) to allow display device to be tucked near or against conveyor assembly for storage, during relocation, or when conveyor assembly is folded up.

Mounting components 66 may also be pivotally connected to conveyor assembly 30 and movable from one side of conveyor assembly 30 to another side of conveyor assembly 30. In this way, at least one display device 58 may be moved from a first side of cold planer 10 to another side of cold planer 10 to accommodate turning or side-specific operations. In some embodiments, the at least one display device 58 includes a plurality of display devices 58 connected to the mobile machine to provide additional visibility. For example, a first display device 58 is shown in FIG. 3 in solid lines to indicate the at least one display device 58 connected to conveyor assembly 30. A second display device 58 is shown in phantom lines to indicate an optional second display device 58 in a location that may otherwise be occupied by the at least one display device 58 when moved from the opposite side of conveyor assembly 30 via mounting components 66.

Referring again to FIG. 2, controllers 60, 62 may each embody a single microprocessor or multiple microprocessors that include a means for monitoring operator and sensor input. For example, controllers 60, 62 may include a memory, a secondary storage device, a clock, and a processor, such as a central processing unit or any other means for accomplishing a task consistent with the present disclosure. Numerous commercially available microprocessors can be configured to perform the functions of controllers 60, 62. It should be appreciated that controllers 60, 62 could readily embody a general machine controller capable of controlling numerous other machine functions. Various other known circuits may be associated with controllers 60, 62, including signal-conditioning circuitry, communication circuitry, and other appropriate circuitry. Controller 60, 62 may be further communicatively coupled with an external computer system, instead of or in addition to including a computer system, as desired.

Controller 60 may be configured to receive as inputs the signals or information, such as D, $V_{CP}$, and $V_{HT}$, generated by one or more of position sensor 42, speed sensors 44, 46, locating devices 48, 50, and/or other devices. Controller 60 may also be configured to determine, among other things, the relative speed $V_{REL}$ of haul truck 18 with respect to cold planer 10 based at least in part on one or more of the inputs received from position sensor 42, speed sensors 44, 46, or combinations thereof. For example, when communication with haul truck 18 via communication devices 52, 54 is unavailable, controller 60 may be configured to determine the distance D between cold planer 10 and haul truck 18 based on the signal generated by position sensor 42. Controller 60 may be configured to compare successive iterations of the signal generated by position sensor 42 (i.e., successive distance measurements) and determine $V_{REL}$ based on the comparison. That is, controller 60 may be configured to compare values of the distance D determined from multiple signals received successively at a certain frequency (i.e. at regular known time intervals) from position sensor 42 to determine a change in the distance D between cold planer 10 and haul truck 18 over the frequency period, which can be used to determine the relative speed $V_{REL}$ of haul truck 18 with respect to cold planer 10.

When communication with haul truck 18 via communication devices 52, 54 is available, and haul truck 18 is equipped with one or more of speed sensor 46 and locating device 50, controller 60 may be configured to compare speed signals from speed sensors 44 and 46 or compare locating signals from locating devices 48 and 50 in order to determine $V_{REL}$. For example, $V_{REL}$ may be equal to the difference between $V_{CP}$, and $V_{HT}$, as determined by a comparison of the signals from speed sensors 44 and 46, respectively. $V_{REL}$ may also be equal to the difference between $V_{CP}$, and $V_{HT}$, where $V_{CP}$, and $V_{HT}$ are each determined by calculating a change in position (e.g., based on a difference between successive location signals that has been translated into a distance) over a change in time (e.g., a known locating signal sample rate period) for cold planer 10 and haul truck 18, respectively. Other ways of determining $V_{REL}$ may be used.

Controller 60 may be configured to receive other or additional inputs from haul truck 18 and/or other off-board entities (e.g., off-board computer 47) via communication device 52. Such inputs may include for example, a vehicle ID of haul truck 18, dimensions of haul truck 18, and capacities of haul truck 18. Dimensions of haul truck 18 may include an overall length, a bed length, an overall height, a bed depth, an overall width, a bed width, and or other dimensions. Capacities of haul truck 18 may include a volumetric capacity (otherwise determinable based on the dimension of haul truck 18), a tare weight, a weight limit, and/or other capacities. Other inputs may include special instructions or information relating to haul truck 18, its operator, or its payload. Such information may be included in a profile of haul truck 18 associated with a unique identifier (e.g., the ID of haul truck 18). In some embodiments, controller 60 may store the associated profile of any number of receptacles, such as haul truck 18, and reference them by ID so that only the ID and/or new information needs to be communicated via communication device 52 during the milling operation. Profile information may be periodically updated by connecting controller 60 to a server, a data bank, or a receptacle controller (e.g., controller 62 of haul truck 18) via communication device 52.

Figure 5:
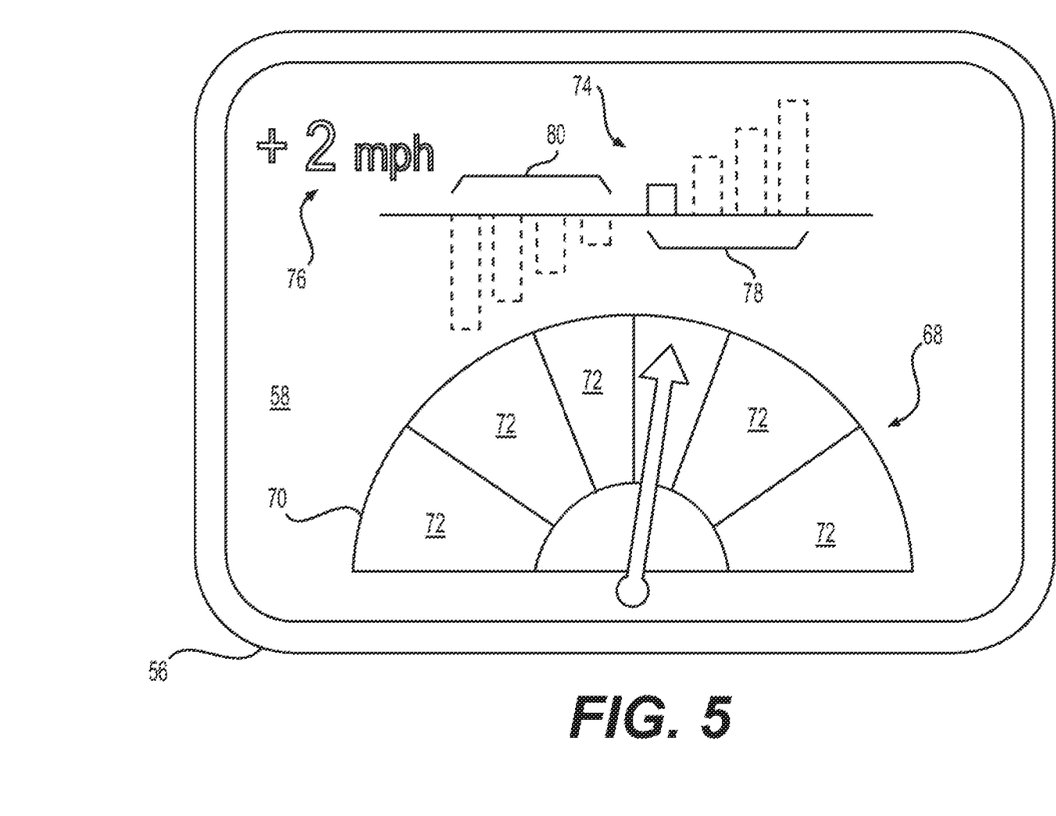
FIGS. 5 and 6 are pictorial illustrations of exemplary disclosed display devices and visual indicators that may be used with the control system of FIG. 2.

Controller 60 may be configured to generate on at least one display device 58 a first visual indicator 68 indicative of the relative speed $V_{REL}$ of haul truck 18 with respect to cold planer 10 using one or more of the inputs discussed above. As shown in FIG. 5, visual indicator 68 may be or include a qualitative indicator of the relative speed $V_{REL}$ of haul truck 18 with respect to cold planer 10 configured to allow the operator of haul truck 18 to visualize the extent to which haul truck 18 is moving too quickly, too slowly, or at a speed within an acceptable range (e.g., a range in which $V_{HT}$ approximately matches $V_{CP}$). For example, visual indicator 68 may include an image of a dial 70 with an arrow, a line, or another shape configured to pivot from a neutral point (e.g., where $V_{CP}$ and $V_{HT}$ are approximately equal) to areas 72 indicative of when between $V_{REL}$ is positive (i.e., when $V_{HT}$ is greater than $V_{CP}$) and when $V_{REL}$ is negative (i.e., when $V_{HT}$ is less than $V_{CP}$).

Areas 72 of visual indicator 68 indicative of positive and negative $V_{REL}$ may be graded to convey an extent or degree to which $V_{CP}$ and $V_{HT}$ differ. For example, visual indicator 68 may be indicative of a degree to which the receptacle is traveling faster than the mobile machine, a degree to which the receptacle is travelling slower than the mobile machine, or when the speed of the receptacle relative to the machine is within a threshold range. Visual indicator 68 may be divided into demarcated sections, each being associated with a different size, different color, a different relative speed range, different levels of brightness, or other indicia of magnitude. Alternatively, visual indicator 68 may be graded according to a fluid transition through a number of colors, sizes, relative speeds, brightness, or other indicia of magnitude. In this way, visual indicator 68 may allow operators to visualize the extent or degree to which their actions of controlling haul truck 18 (e.g., by manipulating the accelerator and/or braking control) translate into changes of $V_{REL}$. This may allow operators to quickly and easily understand how to manipulate the controls of haul truck 18 to achieve a desired change in $V_{REL}$ with accuracy and precision. This may also allow the operator of cold planer 10 to focus on other tasks by relieving the operator from the duty of monitoring the distance D between cold planer 10 and haul truck 18 and providing speed commands to the operator of haul truck 18.

Visual indicator 68 may also or alternatively include other types of qualitative indicia, such as escalating bars 74, a value 76 of $V_{REL}$, a number of illuminating symbols, an image of haul truck 18 leading or lagging behind an image of cold planer 10 (e.g., to convey $V_{REL}$), or other types of indicia. Escalating bars 74 may include space for a plurality of bars to light up or turn off successively as $V_{REL}$ increases or decreases, respectively. In one example, a first set of bars 78 may illuminate as $V_{REL}$ increases in positive values, and a second set of bars 80 may illuminate as $V_{REL}$ increases in negative values. No bars may be illuminated when $V_{CP}$ and $V_{HT}$ are substantially equal or when $V_{REL}$ is within a threshold range. Value 76 of $V_{REL}$ may be a numeric indicia with an associated sign indicative of whether value 76 is positive (i.e., when $V_{HT}>V_{CP}$) or negative (i.e., when $V_{HT}<V_{CP}$). When position sensor 42 and communication devices 52, 54 are not available to supply information to controller 60, visual indicator may 68 be configured to display $V_{CP}$ (not shown in FIG. 5) to allow the operator of haul truck 18 to more clearly understand how fast cold planer 10 is traveling for purposes of more accurately matching $V_{HT}$ to $V_{CP}$ while also relieving the operator of cold planer 10 of the duty of sending signals to the operator of haul truck 18. Other types of indicia may be used, if desired.

Figure 6:
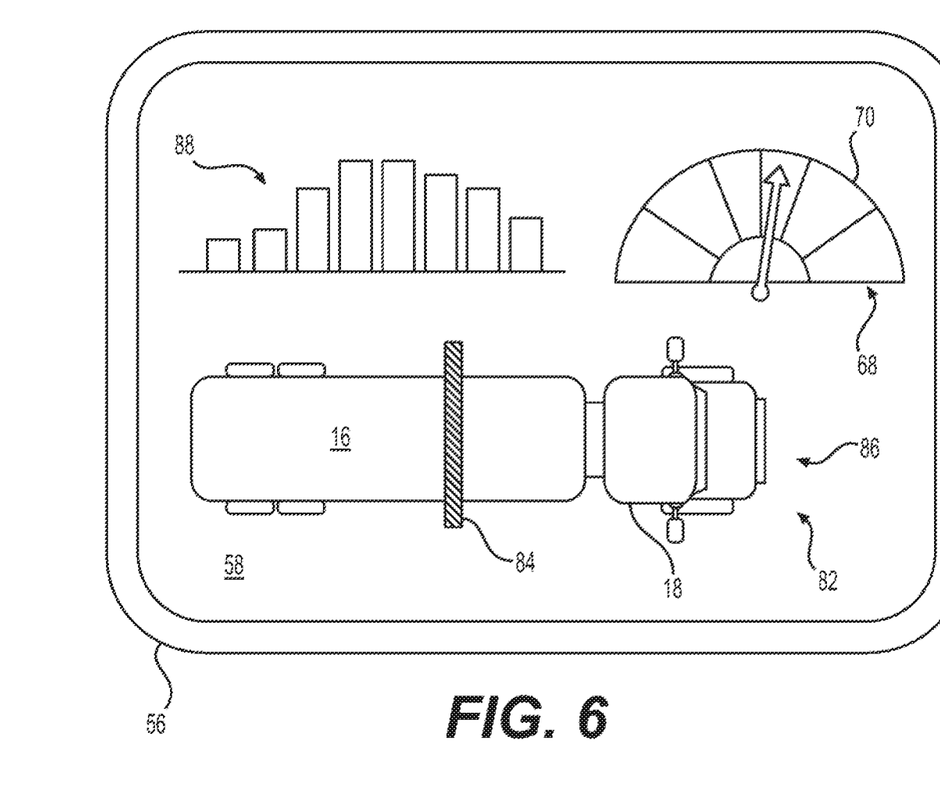

As shown in FIG. 6, controller 60 may also be configured to generate on at least one display device 58 at least a second visual indicator 82 indicative of a reference point location 84 with respect to haul truck 18. Reference point location 84 may be shown on second visual indicator 82 in conjunction with a graphical image 86 of haul truck 18 to allow the operator of haul truck 18 to visualize changes in the distance D between haul truck 18 and cold planer 10 as a result of $V_{REL}$ being greater than or less than zero. Reference point location 84 may represent the location of a reference point related to loading haul truck 18, such as the end of conveyor 38 (referring to FIG. 2), a point location of material that is currently entering bed 16 of haul truck 18, or another reference point of interest. Controller 60 may be configured to move reference point location 84 in response to changes in $V_{REL}$, as determined based on signals from one or more of position sensor 42, speed sensors 44, 46, and/or locating devices 48, 50.

In some embodiments, reference point location 84 may be a calibration set point location established at the beginning of a milling operation. For example, when haul truck 18 is initially placed in a proper location to begin receiving material from conveyor 38, the operator of cold planer 10 may press a button associated with interface devices 34 or provide another kind of input receivable by controller 60 indicative of a calibration set point selection. Upon receiving the operator's input, controller 60 may be configured to determine changes in the distance D between cold planer 10 and haul truck 18 with respect to the set point location represented by reference point location 84. The set point location may assume a default location as the center of bed 16, or a different location (e.g., any location between the front and back of bed 16) may be selected by the operator of cold planer 10 via interface devices 34.

For example, in some embodiments, reference point location 84 may be associated with a fixed target location that represents, for example, the calibration set point established by the operator of cold planer 10. The operator of haul truck 18 may control $V_{HT}$ in order to keep the reference point location 84 on the associated target location. When the operator of cold planer 10 determines that more material should be distributed in a particular area of bed 16 (e.g., a front section, a middle section, a rear section, etc.), the operator may cause controller 60 to move the target position (e.g., by pressing a button associated with interface devices 34). In this way, the operator of haul truck 18 may be able to understand clearly where material should be distributed within bed 16 while also having the ability to accurately and precisely control $V_{HT}$ and $V_{REL}$ to achieve the desired distribution.

Controller 60 may also be configured to generate on at least one display device 58 another or an additional visual indicator indicative of a distribution 88 of time or of transferred material along at least one dimension (e.g., a length, a width, a height, etc.) of haul truck 18 or its bed 16. That is, distribution 88 may be a visual indicator configured to show how much material (e.g., determined in conjunction with equipment and methods configured to determine a material mass flow rate or volumetric flow rate over time, as discussed above) has been transferred into bed 16 at various positions along its length.

Alternatively, distribution 88 may be configured to show how much time the reference point location 84 has spent located at various positions along the length of bed 16, which may allow operators to estimate or qualitatively understand the material distribution within bed 16 as a function of time. For example, as controller 60 determines changes in $V_{REL}$ and resulting changes in the distance D between cold planer 10 and haul truck 18 over time, controller 60 may be configured to coordinate each measured distance D with time spent at each measured distance D and/or with an actual amount of material transferred at each measured distance D. Controller 60 may be configured to then generate distribution 88 based on each measured distance D (e.g., in conjunction with known offsets or the set point location) and the amount of material deposited and/or time spent at each measured distance D to show or allow operators to estimate the material distribution along bed 16.

INDUSTRIAL APPLICABILITY

The disclosed control system may be used with any cold planer where efficiently loading a receptacle, such as a haul truck, is important. The disclosed control system may determine a speed of the haul truck relative to the cold planer based on inputs received entirely from the cold planer or from inputs received from the cold planer and the haul truck. The disclosed control system may generate at least one visual indicator indicative of the speed of the receptacle relative to the mobile machine that can be easily viewed by the operator of the haul truck during milling operations to provide an easily understandable and usable indication of the relative speed to the haul truck operator. The disclosed control system may also relieve the operator of the cold planer from a need to constantly monitor the distance between the cold planer and the haul truck and from the duty of communicating speed commands to the operator of the haul truck. The disclosed control system may improve the quality of information relating to the relative speed of the haul truck to the haul truck operator, thereby allowing haul truck operators to improve accuracy and precision of haul truck position control. Operation of control system 40 will now be explained.

At the beginning of the milling process, haul truck 18 may approach cold planer 10 and be aligned with conveyor 38 at a desired initial distance D for receiving milled material. In some embodiments, cold planer 10 may establish a communication link with haul truck 18 at about this time for exchanging information, such as the dimensions of haul truck 18, payload information, driver information, special instructions, and/or other profile information. The communication link may be automatically established when haul truck 18 is within a threshold distance of cold planer 10.

In some embodiments, the operator of cold planer 10 may set a calibration set point position at about this time. To establish the calibration set point, the operator of cold planer 10 may press a button associated with interface devices 34 or provide another kind of input receivable by controller 60 indicative of a desire to set the calibration set point based on the current positioning of haul truck 18 relative to cold planer 10. Upon receiving the operator's input, controller 60 may determine future changes in the distance D between cold planer 10 and haul truck 18 with respect to the set point location.

As the milling operation commences, cold planer 10 may travel forward and remove a portion of surface 14 in its path. Milled material may be transferred by first conveyor 36 to second conveyor 38, and second conveyor 38 may discharge the material into bed 16 of haul truck 18. As material is transferred into haul truck 18, controller 60 may continually determine the relative speed $V_{REL}$ of haul truck 18 with respect to cold planer 10. For example, controller may determine $V_{REL}$ based on a calculated difference between successive measurements by position sensor 42 of the distance D between haul truck 18 and cold planer 10 over a period of time. Alternatively, controller 60 may determine $V_{REL}$ based on a comparison of speed signals from speed sensors 44 and 46 or a comparison of locating signals from locating devices 48 and 50.

Controller 60 may then generate visual indicator 68 on at least one display device 58 to allow the operator of haul truck 18 to visualize changes in $V_{REL}$ as the operator controls the speed $V_{HT}$ of haul truck 18. Visual indicator 68 may allow the operator of haul truck 18 to visualize the extent to which haul truck 18 is moving too quickly, too slowly, or at a speed within an acceptable range (e.g., a range in which $V_{HT}$ approximately matches $V_{CP}$). This may allow operators of haul truck 18 to quickly and easily understand how to manipulate the controls of haul truck 18 to achieve a desired change in $V_{REL}$ with accuracy and precision. This may also allow the operator of cold planer 10 to focus on other tasks by relieving them from the duty of constantly monitoring the distance D between cold planer 10 and haul truck 18 and providing speed commands to the operator of haul truck 18.

In some embodiments, as conveyor 38 discharges material into haul truck 18 and controller 60 determines the distance D between haul truck 18 and cold planer 10, controller 60 may also determine the amount of material that is being or has been transferred into haul truck 18 and/or the amount of time haul truck 18 spends at each measured distance D from cold planer 10. Based on signals received from mass flow rate or volume flow rate sensory equipment in conjunction with the calibration set point location and/or known dimensions of haul truck 18, controller 60 may then coordinate each measured distance D with the quantity of material and/or time accumulated at each distance D to track the distribution of material within bed 16 of haul truck 18. Using this information, controller 60 may then generate visual indicator 82 on at least one display device 58 to allow the operator of haul truck 18 to visualize an actual material distribution within bed 16 or to estimate the material distribution based on an understanding of how much time haul truck 18 spent at each measured distance D. Visual indicator 82 may also allow the operator of haul truck 18 to visualize changes in the position of haul truck 18 relative to the set point location, cold planer 10, or a component of cold planer 10 (e.g., conveyor 38).

The operator of haul truck 18 may view display device 58 through mirrors 19, 64 of haul truck 18 during the milling operation. Display devices 58 may be positioned on one or more sides of cold planer 10 to allow the operator of haul truck 18 to use mirrors 19, 64 on either side of haul truck 18. Display devices 58 may be fully adjustable at their mounting location to allow operators of haul truck 18 to easily see display devices 58. When only one display device 58 is available, an operator or other personnel may adjust mounting components 66 of display system 56 as needed to allow display device 58 to be viewed by the operator of haul truck 18 from a desired side of cold planer 10. Display device 58 may be manually adjustable by personnel or with the assistance of motorized control equipment having wired or wireless controllers available to operators of cold planer 10 and/or haul truck 18 or other personnel. In some situations, such as when cold planer 10 and haul truck 18 are owned and/or operated by the same entity, display device 58 may be positioned within haul truck 18 and configured to communicate with controller 60 in order to display information to the operator of haul truck 18.

Several advantages may be associated with the disclosed control system 40. For example, because control system 40 may determine the relative speed $V_{REL}$ of haul truck 18 with respect to cold planer 10, and generate visual indicators 68, 82 based on $V_{REL}$, operators of haul truck 18 may be able to easily ascertain and understand changes in $V_{REL}$ that result from their control of haul truck 18. This may allow operators to more accurately and precisely control the distance D between cold planer 10 and haul truck 18. This may also relieve operators of cold planer 10 from needing to constantly monitor the distance D and communicate speed commands to the operator of haul truck 18. Because visual indicators 68, 82 may include qualitative representations of $V_{REL}$ and/or other information, control system 40 may improve the quality of information relating to $V_{REL}$ and other aspects of the milling operation that are shared with the haul truck operator, thereby allowing haul truck operators to improve accuracy and precision of haul truck position control.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

The invention claimed is:

1. A method of tracking material received in a bed of a haul truck, comprising:
   transferring material from a cold planer into the bed of the haul truck;
   using a camera coupled to the cold planer to determine an amount of material transferred into the bed of the haul truck by a conveyor of the cold planer; and
   providing, on a display located in the haul truck, a visualization of an actual distribution of the material within the bed of the haul truck.

2. The method of claim 1, further including:
   exchanging information from the haul truck to a controller of the cold planer over a communication link.

3. The method of claim 1, wherein the visualization shows how much material has been transferred into the bed of the haul truck at various positions along a length of the haul truck.

4. The method of claim 3, wherein the visualization includes indicia on the display.

5. The method of claim 3, wherein the visualization is based, at least in part, on a haul truck profile associated with the haul truck.

6. The method of claim 5, wherein the haul truck profile includes one or more dimensions of the haul truck and/or a capacity of the haul truck.

7. The method of claim 1, further including determining a relative speed of travel between the cold planer and the haul truck.

8. The method of claim 7, further including:
receiving, on the display of the haul truck, a visual indicator indicative of the relative speed between the cold planer and the haul truck.

9. The method of claim 1, further including:
receiving, on the display of the haul truck, a visual indicator of a reference point relative to the bed of the haul truck, wherein the reference point is indicative of at least one of a location of an end of a conveyor of the cold planer relative to the bed of the haul truck, or a location of the bed of the haul truck at which the material is being delivered.

10. A method of tracking material received in a bed of a haul truck, comprising:
receiving material from a cold planer into the bed of the haul truck; and
generating a signal indicative of an amount of material being transferred to the bed of the haul truck via a camera; and
receiving, on a display of the haul truck, a visual indicator indicative of the material received in the bed of the haul truck based on the signal.

11. The method of claim 10, further including:
determining a distribution of the material received within the bed of the haul truck based on the signal.

12. The method of claim 11, further including:
adjusting a position of at least one of the haul truck and the cold planer relative to the other of the haul truck and the cold planer based on the distribution of the material received within the bed of the haul truck.

13. The method of claim 10, further including:
exchanging information from the haul truck to a controller of the cold planer over a communication link.

14. The method of claim 10, further including determining a relative speed of travel between the cold planer and the haul truck.

15. A method of tracking material received in a bed of a haul truck, comprising:
receiving material from a cold planer into the bed of the haul truck; and
determining a distribution of the material received within the bed of the haul truck based, at least in part, on a signal from a camera of the cold planer; and
receiving, on a display of the haul truck, a visual indicator indicative of the distribution of material received within the bed of the haul truck.

16. The method of claim 15, further including:
exchanging information from the haul truck to a controller of the cold planer over a communication link.

17. The method of claim 15, wherein determining the distribution of material received within the bed of the haul truck is further based, at least in part, on a haul truck profile associated with the haul truck, and wherein the haul truck profile includes one or more dimensions of the haul truck and/or a capacity of the haul truck.

18. The method of claim 15, further including determining a relative speed of travel between the cold planer and the haul truck.

19. The method of claim 15, wherein the haul truck is a first haul truck, the method further including:
replacing the first haul truck with a second haul truck when the bed of the first haul truck is full.

20. The method of claim 15, further including:
receiving, on the display of the haul truck, a visual indicator of a reference point relative to the bed of the haul truck, wherein the reference point is indicative of at least one of a location of an end of a conveyor of the cold planer relative to the bed of the haul truck, or a location of the bed of the haul truck at which the material is being delivered.

* * * * *